US 6,397,994 B1

(12) United States Patent
Bowen

(10) Patent No.: US 6,397,994 B1
(45) Date of Patent: Jun. 4, 2002

(54) POWERSHIFT TRANSMISSION WITH ENGINE CLUTCH ASSEMBLY

(75) Inventor: Thomas C. Bowen, Rochester Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/757,819

(22) Filed: Jan. 10, 2001

(51) Int. Cl.$^7$ .......................... F16D 21/02; F16D 23/00

(52) U.S. Cl. ..................................... 192/48.9; 192/91 R

(58) Field of Search ....................... 74/330, 331, 337.5, 74/356; 192/48.8, 48.9, 87.14, 87.15, 87.16, 89.2, 91 A, 91 R

(56) References Cited

U.S. PATENT DOCUMENTS

| | | | | |
|---|---|---|---|---|
| 4,714,147 A | * | 12/1987 | Szodfridt et al. | ......... 192/87.15 |
| 4,966,270 A | * | 10/1990 | Rispeter et al. | .......... 192/87.15 |
| 5,125,282 A | * | 6/1992 | Bender et al. | ................. 74/359 |
| 5,598,910 A | * | 2/1997 | Moroto et al. | ............. 192/48.2 |
| 5,711,409 A | * | 1/1998 | Murata | ..................... 192/87.11 |
| 5,890,392 A | | 4/1999 | Ludanek et al. | |
| 5,943,911 A | | 8/1999 | Beckerman | |
| 5,966,989 A | | 10/1999 | Reed, Jr. et al. | |
| 6,209,406 B1 | | 4/2001 | Sperber et al. | |
| 6,209,407 B1 | | 4/2001 | Sperber et al. | |

\* cited by examiner

Primary Examiner—Christopher P. Schwartz
(74) Attorney, Agent, or Firm—Harness, Dickey & Pierce P.L.C.

(57) ABSTRACT

An automated powershift multi-speed transmission adapted to transfer power from the engine to the driveline of a motor vehicle. The transmission includes an engine clutch assembly having a primary clutch operable to establish a releasable drive connection between the engine and a first input shaft, and a secondary clutch operable to establish a releasable drive connection between the engine and a second input shaft. The transmission also includes an output shaft adapted to transfer power to the driveline, and a geartrain for selectively establishing a plurality of forward and reverse speed ratio drive connections between the input shafts and the output shaft. In addition, the transmission includes power-operated dog clutches for selectively engaging constant-mesh gearsets associated with the geartrain, and a transmission controller for controlling coordinated actuation of the engine clutch assembly and the power-operated dog clutches to permit non-power interrupted ("powershift") sequential gear changes automatically without input from the vehicle operator. A clutch control system includes a first hydraulic pump driven by the first input shaft, a second hydraulic pump driven by the second input shaft, and flow control valving for controlling fluid flow between the first and second pumps. When shifting under power between gear ratios, one of the clutches associated with the engine clutch assembly is released such that the pump associated with the driven input shaft supplies fluid to the pump associated with released input shaft for causing acceleration/deceleration of the released input shaft into synchronization with the output shaft. Following completion of speed synchronization, the dog clutch for the selected gearset associated with the released input shaft is actuated and thereafter the released clutch is re-engaged and the engaged clutch is released.

17 Claims, 3 Drawing Sheets

POWERSHIFT TRANSMISSION WITH ENGINE CLUTCH ASSEMBLY

FIELD OF THE INVENTION

The present invention relates generally to transmissions for use in motor vehicles and, more particularly, to a twin-clutch automated transmission applicable for use in rear-wheel drive vehicles.

BACKGROUND OF THE INVENTION

Automobile manufacturers continuously strive to improve fuel efficiency. This effort to improve fuel efficiency, however, is typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting results in a harsh shift feel which is generally considered to be unacceptable when compared to smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch transmissions overcome several drawbacks associated with conventional single-clutch automated transmissions, a need exists to develop simpler and more robust transmissions which advance the automotive transmission technology.

SUMMARY OF THE INVENTION

Accordingly, it is an object of the present invention to provide an automated powershift transmission and a control system for permitting automatic shifting of the transmission.

This and other objects of the present invention are met by providing an automated powershift multi-speed transmission adapted to transfer power from the engine to the driveline of a motor vehicle. The transmission includes an engine clutch assembly having a primary clutch operable to establish a releasable drive connection between the engine and a first input shaft, and a secondary clutch operable to establish a releasable drive connection between the engine and a second input shaft. The transmission also includes an output shaft adapted to transfer power to the driveline, and a geartrain for selectively establishing a plurality of forward and reverse speed ratio drive connections between the input shafts and the output shaft. In addition, the transmission includes power-operated dog clutches for selectively engaging constant-mesh gearsets associated with the geartrain, and a transmission controller for controlling coordinated actuation of the engine clutch assembly and the power-operated dog clutches to permit non-power interrupted ("powershift") sequential gear changes automatically without input from the vehicle operator. A clutch control system includes a first hydraulic pump driven by the first input shaft, a second hydraulic pump driven by the second input shaft, and flow control valving for controlling fluid flow between the first and second pumps. When shifting under power between gear ratios, one of the clutches associated with the engine clutch assembly is released such that the pump associated with the driven input shaft supplies fluid to the pump associated with released input shaft for causing acceleration/deceleration of the released input shaft into synchronization with the output shaft. Following completion of speed synchronization, the dog clutch for the selected gearset associated with the released input shaft is actuated and thereafter the released clutch is re-engaged and the engaged clutch is released.

In accordance with an alternative arrangement, the clutch control system can include a single control valve in combination with the engine clutch assembly operable for selectively establishing drive connections between the engine and each of the first and second input shafts.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the scope of this invention will become apparent to those skilled in the art.

DETAILED DESCRIPTION OF THE PREFERRED EMBODIMENT

Figure 1:
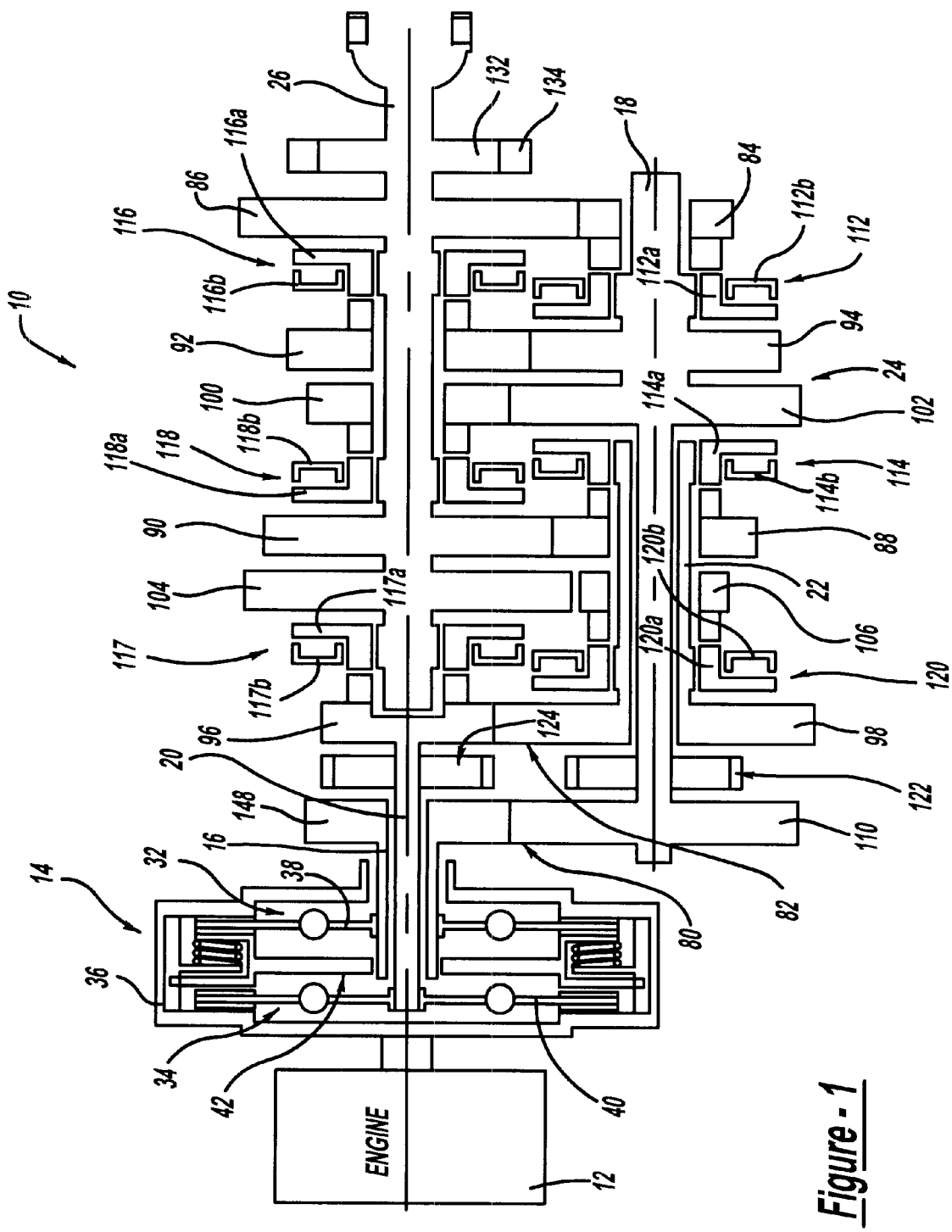
FIG. 1 is a schematic view of an automated powershift transmission according to the principles of the present invention.
Figure 2:
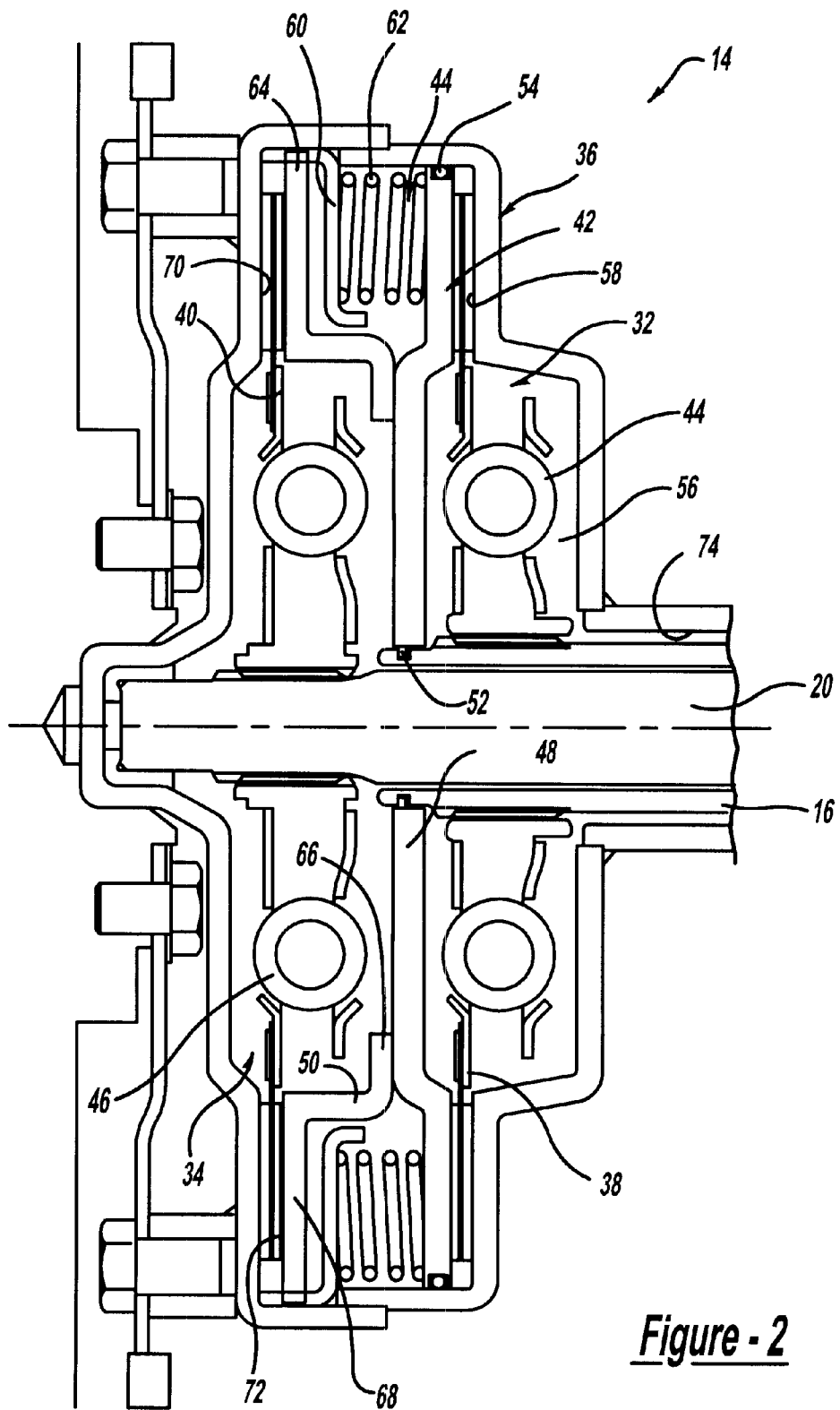
FIG. 2 is a sectional view of the engine clutch assembly used with the transmission shown in FIG. 1.

With reference to the drawings, an automated powershift transmission 10 will now be described. Transmission 10 is driven by the output of engine 12 and generally includes an engine clutch assembly 14, a first input shaft 16 driving a first countershaft 18, a second input shaft 20 driving a second countershaft 22, a split-path geartrain 24, an output shaft 26, a clutch control system 28, and a shift control system 30.

Engine clutch assembly 14 includes a primary clutch 32 for establishing a drive connection between engine 12 and first input shaft 16, and a secondary clutch 34 for establishing a drive connection between engine 12 and second input shaft 20. Primary and secondary clutches 32 and 34 are disposed within a clutch housing 36 that is fixed to the output of engine 12 and include a primary friction plate 38 fixed to first input shaft 16, a secondary friction plate 40 fixed to second input shaft 20, a piston assembly 42, and a spring assembly 44. Primary friction plate 38 is fixed to a damper assembly 44 which is splined for rotation with first input shaft 16. Similarly, secondary friction plate 40 is fixed to a damper assembly 46 which is splined for rotation with second input shaft 20.

Piston assembly 42 includes a piston plate 48 and an apply plate 50. Piston plate 48 is sealed relative to input shaft 16 and housing 36 via O-ring seals 52 and 54 so as to define an annular pressure chamber 56. Spring assembly 44 is arranged to normally apply a clutch engagement force on piston plate 48 for frictionally clamping primary friction plate 38 against an inner surface 58 of housing 36, thereby causing first input shaft 16 to be driven by the output of engine 12. Spring assembly 44 includes an annular spring retainer 60 fixed for rotation with housing 36 and a plurality of coil springs 62 disposed between spring retainer 60 and a back-side surface of piston plate 48. Apply plate 50 includes a first end 64 fixed (i.e., splined) to clutch housing 36, a second end defining an annular rim 66 engaging piston plate 48, and an intermediate disc segment 68. Secondary friction plate 40 is disposed between an inner surface 70 of clutch housing 36 and a face surface 72 of disc segment 68 of apply plate 50.

With piston plate 48 clamped via springs 62 to primary friction plate 38, apply plate 50 is released from frictional engagement with secondary friction plate 40 such that clutch housing 36 is free to rotate relative to second input shaft. In this condition, primary clutch 32 is engaged and secondary clutch 34 is released. As will be detailed, the delivery of high pressure fluid through a flow passage 74 to pressure chamber 56 results in piston plate 48 being forcibly urged out of engagement with primary friction plate 38 so as to release primary clutch 32. Moreover, such movement of piston plate 48 causes concurrent movement of apply plate 50 for frictionally clamping secondary friction plate 40 to housing 36, thereby engaging secondary clutch 34 to establish the drive connection between engine 12 and second input shaft 20.

Referring again to FIG. 1, geartrain 24 includes a first headset 80 connecting first input shaft 16 to first countershaft 18, a second headset 82 connecting second input shaft 20 to second countershaft 22, and a plurality of constant-mesh gearsets between output shaft 26 and countershafts 18 and 22. Specifically, geartrain 24 includes six gearsets arranged to establish five forward ratio drive connections and a reverse ratio drive connection. A first gearset includes a first speed gear 84 rotatably supported on first countershaft 18 which is meshed with a first output gear 86 fixed to output shaft 26. A second gearset includes a second speed gear 88 rotatably supported on second countershaft 22 which is meshed with a second output gear 90 fixed to output shaft 26. A third gearset includes a third output gear 92 rotatably supported on output shaft 26 which is meshed with a third speed gear 94 fixed to first countershaft 18. Second headset 82 acts as part of the fourth gearset which includes a fourth speed gear 96 fixed to second input shaft 20 and which is meshed with a. transfer gear 98 fixed to second countershaft 22. A fifth gearset includes a fifth output gear 100 rotatably supported on output shaft 26 which is meshed with a fifth drive gear 102 fixed to first countershaft 18. Finally, a sixth gearset includes reverse output gear 104 fixed to output shaft 26, a reverse speed gear 106 rotatably supported on second countershaft 22, and a reverse idler gear (not shown) meshed with reverse speed gear 106 and reverse output gear 104. Thus, the first, third and fifth forward drive connections are established between first countershaft 18 and output shaft 26 while the second and fourth forward drive connections and the reverse drive connection are established between second countershaft 22 and output shaft 26.

To provide a robust and compact package, first input shaft 16 is concentrically supported on second input shaft 20 while second countershaft 22 is concentrically supported on first countershaft 18. To provide a fixed ratio drive connection between first input shaft 16 and first countershaft 18, first headset 80 includes an input gear 108 fixed to first input shaft 16 which is meshed with a transfer gear 110 fixed to first countershaft 18. Likewise, second headset 82 provides a second fixed ratio drive connection between second input shaft 20 and second countershaft 22 and, as noted, includes fourth speed gear 96 fixed to second input shaft 20 which is meshed with transfer gear 98 fixed to second countershaft 22.

Shift control system 30 includes a plurality of electrically-actuated dog clutches which are operable for selectively coupling a selected speed gear to output shaft 26 for establishing the five forward and one reverse speed ratio drive connections. These electrically-actuated dog clutches include a first dog clutch 112 operable for selectively coupling first speed gear 84 to first countershaft 18, a second dog clutch 114 operable for selectively coupling second speed gear 88 to second countershaft 22, and a third dog clutch 116 operable for selectively coupling third output gear 92 to output shaft 26. Additionally, a fourth dog clutch 117 is operable for selectively coupling fourth speed gear 96 to output shaft 26, a fifth dog clutch 118 is operable for selectively coupling fifth output gear 100 to output shaft 26, and a sixth dog clutch 120 is operable for selectively coupling/releasing reverse speed gear 106 to/from second countershaft 22. Each dog clutch includes a sliding sleeve (denoted by the suffix "A") which is splined for rotation with an axial movement on a clutch hub which, in turn, is fixed to the corresponding shaft. As is conventional, axial movement of the sliding sleeves from the neutral uncoupled positions shown results in clutched engagement with the adjacent gear. Preferably, each dog clutch is of the electromagnetic type having a coil (denoted by suffix "B") adjacent to and facing a radial armature plate segment of each sliding sleeve. Electrical power delivered to the coils causes controlled axial movement of the shift sleeves. It is to be understood that any other type of power-operated device capable of moving each sliding sleeve between its uncoupled and coupled positions is within the scope of this invention.

Figure 3:
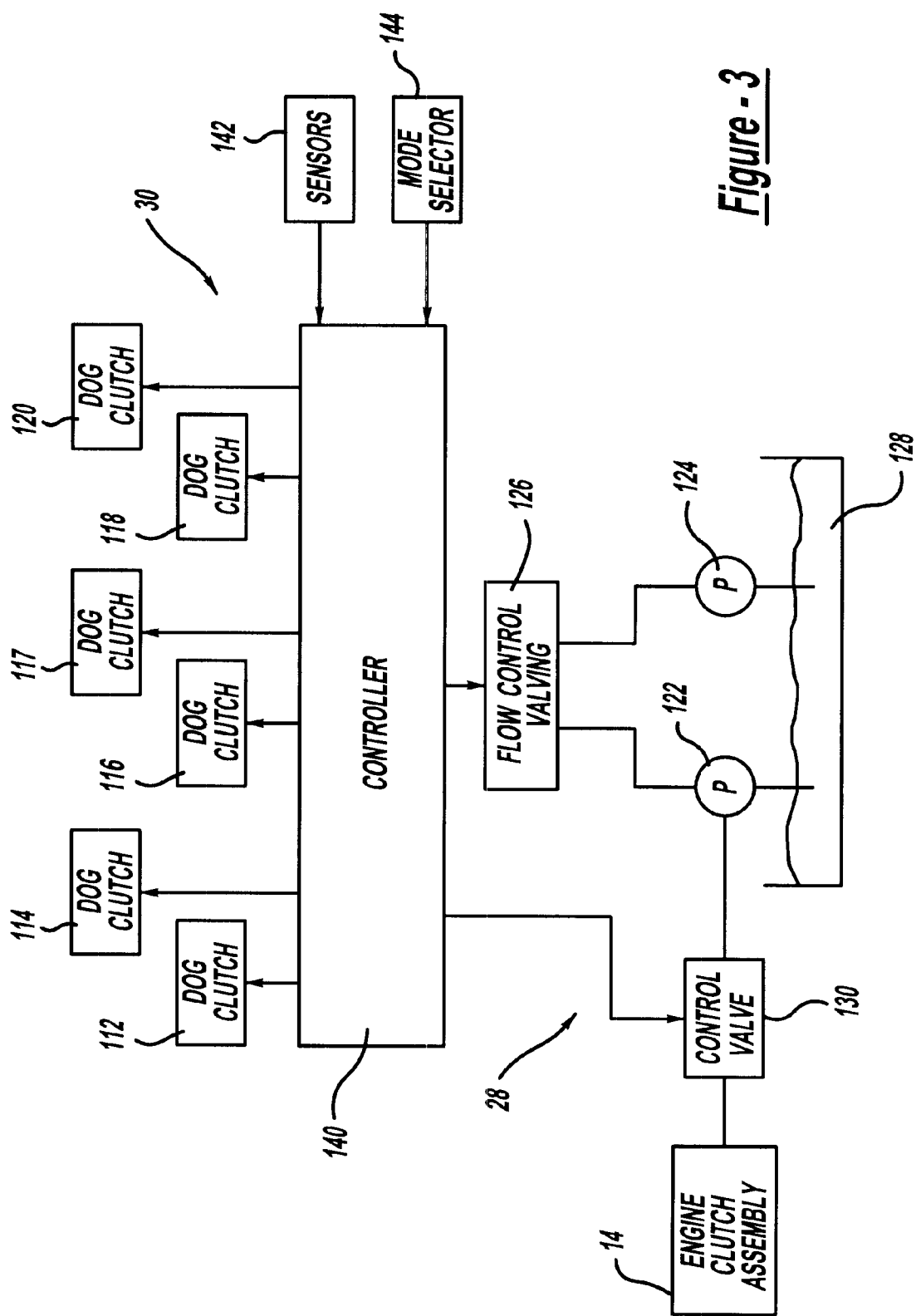
FIG. 3 is a diagrammatically illustration of the transmission control system adapted for use with the automated powershift transmission of the present invention.

Clutch control system 28 includes a first hydraulic pump 122 driven by first countershaft 20, a second hydraulic pump 124 driven by second input shaft 20, and flow control valving 126 interconnecting first pump 122 and second pump 124. Preferably pumps 122 and 124 are shaft-driven pumps, such as gerotor pumps, but can optionally be electrically controlled if desired. As schematically shown in FIG. 3, pumps 122 and 124 draw fluid from a sump 128 internal transmission 10. Clutch control system 28 further includes an electrically-controlled control valve 130 providing fluid communication between pressure chamber 56 and first pump 122. Thus, control valve 130 is capable of providing variable pressure control. Preferably, is a pulse-width modulated (PWM) valve.

In operation, rotation of first input shaft 16 causes first pump 122 to draw fluid from internal sump 128 and supply high pressure fluid to control valve 130. In addition, flow control valving 126 functions to regulate the transfer of high-pressure fluid between hydraulic pumps 122 and 124 such that the pump associated with the released (i.e., non-driven) one of input shafts 16 and 20 acts as a motor/brake for advancing/retarding the speed of the non-driven input shaft into speed synchronization with output shaft 26. Thus, pumps 122 and 124 act as hydraulic synchronizers which function to synchronize the speed of output shaft 26 to input shafts 16 and 20 prior to actuation of any of the electrically-actuated dog clutches.

Geartrain 22 is shown in FIG. 1 to further include a parking wheel 132 fixed to output shaft 26 and which can be selectively engaged by a parking pawl 134 for releasably locking output shaft 26 to a stationary member (i.e., the housing of transmission 10) to selectively prevent rotation of output shaft 26. Parking pawl 134 is operable to release output shaft 26 when the gearshift lever is moved out of its PARK position and lock output shaft 26 when the gearshift lever is returned to its PARK position.

In addition to the above, transmission 10 includes a transmission controller 140 which receives various sensor input signals, denoted diagrammatically by block 142. Transmission controller 140 is an electronically-controlled unit capable of receiving data from the vehicle sensors and generating output signals in response to the sensor input signals. The sensor input signals delivered to controller 140 can include, without limitation, engine speed, throttle position, brake status, input shaft speeds, output shaft speed and the on-off status of the dog clutches. Controller 140 is operable to coordinate and monitor actuation of all the electrically-controlled devices associated with clutch control system 28 and shift control system 30, so as to permit powershifted sequential gear changes automatically without any input from the vehicle operator. As such, transmission 10 is capable of being smoothly shifted automatically without power interruption. If desired, a manually-operable mode selector switch 144 can be provided to shift transmission 10 from its automatic shift mode to a manual shift mode. Mode switch 144 would, when actuated, allow the vehicle operator to shift the gearshift lever manually to effect sequential gear shifts (without use of a clutch pedal). However, controller 140 would only permit the selected gearshift to be completed if the current vehicle characteristics (i.e., engine speed, vehicle speed, etc.) permit completion of the requested shift.

When it is desired to operate the vehicle, engine 12 is started with the gearshift lever in its PARK position and primary clutch 32 engaged such that input shaft 16 is in drive connection with the output of engine 12. However, all of the electrically-actuated dog clutches are released with each shift sleeve located in its neutral uncoupled position, whereby no drive torque is delivered through geartrain 24 to output shaft 26. When the vehicle operator moves the gearshift lever from the PARK position to the DRIVE position, parking pawl 134 is released and primary clutch 32 is also released. In particular, controller 140 actuates control valve 130 to deliver high pressure fluid to chamber 56 to move piston plate 48 such that primary clutch 32 is released, whereby the drive connection between engine 12 and first input shaft 16 is released. However, since such movement of piston plate 48 causes secondary clutch 34 to be engaged, driven rotation of second input shaft 20 causes second pump 124 to supply pressurized fluid through flow control valving 126 to first pump 122 which then acts as a brake to stop rotation of first input shaft 16. Thereafter, first dog clutch 112 is actuated by controller 140 sending an electrical signal to coil 112B for moving sliding sleeve 112A into clutched engagement with first speed gear 84. As such, first speed gear 84 is coupled for rotation with first countershaft 18. Thereafter, controller 140 causes control valve 130 to vent chamber 56 for engaging primary clutch 32 and releasing secondary clutch 34. With primary clutch 32 engaged, engine power is delivered through first input shaft 16, headset 80, first countershaft 18, first speed gear 84 and first output gear 86 to output shaft 26 for establishing the first forward drive ratio connection.

When the vehicle operating parameters indicate a need to shift into the second forward gear ratio, controller 140 actuates control valving 126 such that first pump 122 delivers fluid to second pump 124 which then acts to retard rotation of second input shaft 20 so as to synchronize its rotary speed to that of output shaft 26. When controller 140 determines that speed synchronization is complete, second dog clutch 114 is actuated by controller 140 sending electric power to energize coil 114B for moving sliding sleeve 114A into clutched engagement with second speed gear 88. As such, second speed gear 88 is coupled for rotation with second countershaft 22. Thereafter, controller 140 actuates control valve 130 to release primary clutch 32 and engage secondary clutch 34. Once primary clutch 32 is released completely, controller 140 causes first dog clutch 112 to return sliding sleeve 112A to its neutral position for uncoupling first speed gear 84 from first countershaft 18. With secondary clutch 34 engaged, engine power is delivered through second input shaft 20, headset 82, second countershaft 22, second speed gear 88 and second output gear 90 to output shaft 26 for establishing the second forward drive connection.

To automatically establish the third forward gear ratio, second pump 124 driven by second input shaft 20 delivers pressurized fluid through valving 126 to first pump 122 for causing the rotary speed of non-driven first input shaft 16 to be synchronized with that of output shaft 26. Upon completion of synchronization, controller 140 energizes coil 116B of third dog clutch 116 for moving sleeve 116A into clutched engagement with third output gear 92. Thereafter, controller 140 coordinates the release of secondary clutch 34 and the engagement of primary clutch 32. Once secondary clutch 34 is released, second dog clutch 114 returns sleeve 114A to its neutral position for releasing second speed gear 88 from engagement with second countershaft 22.

As will be appreciated, this upshift process continues through each of the other forward speed gear ratios and likewise works in reverse for downshifts. With this powershift methodology, transmission 10 shifts between engine clutches in a power-on shift strategy (i.e., no power interruption). It should be noted that connection of fourth speed gear 96 to output shaft 26 via fourth dog clutch 117 establishes a direct drive ratio connection between second input shaft 20 and output shaft 26. As such, the fifth forward speed ratio is preferably an overdrive ratio. Primary clutch 32 of engine clutch assembly 14, drives the portion of geartrain 24 containing the highest gear ratio (i.e., $5^{th}$ gear) to eliminate the need for hydraulic pressure in chamber 56 at cruising speeds, thereby reducing parasitic losses. Moreover, since the clutches have a large diameter, relatively low hydraulic pressure can be used to shift engine clutch assembly 14.

A preferred embodiment of the invention has been disclosed to provide those skilled in the art an understanding of the best mode currently contemplated for the operation and construction of the automated powershift transmission. The invention being thus described, it will be obvious that various modifications can be made without departing from the true spirit and scope of the invention, and all such modifications as would be considered by those skilled in the art are intended to be included within the scope of the following claims.

What is claimed is:

1. A powershift transmission for use in a motor vehicle having an engine and a driveline, comprising:

an output shaft adapted for connection to the driveline;

a first input shaft;

a second input shaft;

a geartrain which can be selectively engaged for establishing a first drive connection between said first input shaft and said output shaft and a second drive connection between said second input shaft and said output shaft;

an engine clutch assembly having a housing adapted to be driven by the engine, a first clutch plate fixed to said first input shaft, a second clutch plate fixed to said second input shaft, and a piston disposed between said first and second clutch plates, said piston is operable in a first position to exert a clutch engagement force on said first clutch plate for establishing a drive connection between said housing and said first input shaft, and said piston is operable in a second position to exert a clutch engagement force on said second clutch plate for establishing a drive connection between said housing and said second input shaft, and a spring assembly for biasing said piston to its first position; and a power-operated actuator for moving said piston from its first position to its second position in opposition to the biasing of said spring assembly.

2. The powershift transmission of claim 1 wherein said housing defines a pressure chamber and said piston is disposed within said pressure chamber, and wherein said power-operated actuator is a hydraulic control valve operable for controlling the flow of high pressure fluid into said pressure chamber for moving said piston from its first position to its second position.

3. The powershift transmission of claim 2 wherein said control valve is further operable to control the discharge of high pressure fluid from said pressure chamber for permitting said spring assembly to move said piston from its second position to its first position.

4. The powershift transmission of claim 2 wherein said piston includes a piston plate disposed adjacent to said first clutch plate, and an apply plate disposed adjacent to said second clutch plate.

5. The powershift transmission of claim 4 wherein said piston plate is sealed between said first input shaft and said housing to define said pressure chamber within said housing.

6. A powershift transmission for use in a motor vehicle having an engine and a driveline, comprising:

an output shaft adapted for connection to the driveline;

a first input shaft driving a first countershaft;

a second input shaft driving a second countershaft;

an engine clutch assembly having a primary clutch operable for establishing a releasable drive connection between the engine and said first input shaft, and a secondary clutch operable for establishing a releasable drive connection between the engine and said second input shaft;

a first constant-mesh gearset supported between said first countershaft and said output shaft;

a second constant-mesh gearset supported between said second countershaft and said output shaft;

a first shift clutch for releasably engaging said first gearset to establish a drive connection between said first countershaft and said output shaft;

a first shift clutch for releasably engaging said second gearset to establish a drive connection between said second countershaft and said output shaft;

a first fluid pump driven by said first input shaft;

a second fluid pump driven by said second input shaft; and a flow path connecting said first pump to said second pump such that when said primary clutch and first shift clutch are engaged and said secondary clutch and second shift clutch are released, driven rotation of said first input shaft causes high pressure fluid to be transferred through said flow path from said first pump to said second pump for synchronizing the rotary speed of said second gearset driven by said released second input shaft to that of said output shaft.

7. The powershift transmission of claim 6 wherein said first and second shift clutches are electrically-actuated dog clutches.

8. The powershift transmission of claim 6 wherein said first input shaft is tubular with said second input shaft rotatably supported by said tubular first input shaft.

9. The powershift transmission of claim 6 wherein said second countershaft is coaxially supported for rotation on said first countershaft.

10. The powershift transmission of claim 6 wherein said first gearset includes a first speed gear rotatably supported on said first countershaft which is meshed with a first output gear fixed to said output shaft, and wherein said second gearset includes a second speed gear rotatably supported on said second countershaft which is meshed with a second output gear fixed to said output shaft.

11. The powershift transmission of claim 6 wherein said primary clutch is a spring-applied hydraulically-released friction clutch, and said secondary clutch is a spring-released hydraulically-applied friction clutch, and wherein a source of hydraulic fluid is supplied to a pressure chamber to move a piston for releasing said primary clutch and engaging said secondary clutch.

12. The powershift transmission of claim 11 wherein said hydraulic fluid source includes a control valve supplied with high pressure fluid from one of said first and second fluid pumps, said control valve operable to control the flow of fluid to said pressure chamber.

13. A powershift transmission for use in a motor vehicle having an engine and a driveline, comprising:

an output shaft adapted for connection to the driveline;

a first input shaft driving a first countershaft;

a second input shaft driving a second countershaft;

a primary clutch operable for establishing a releasable drive connection between the engine and said first input shaft;

a secondary engine clutch operable for establishing a releasable drive connection between the engine and said second input shaft;

a geartrain including a first gearset supported between said first countershaft and said output shaft, and a second gearset supported between said second countershaft and said output shaft;

a first shift clutch operable for releasable engaging said first gearset;

a second shift clutch operable for releasably engaging said second gearset;

a first fluid pump driven by said first input shaft;

a second fluid pump driven by said second input shaft;

a first control valve for controlling fluid flow between said first and second fluid pumps, a second control valve for controlling actuation of said primary and second clutches; and a transmission control system for controlling coordinated actuation of said first and second control valves to cause powershift sequential gear shifts, such that when one of said first and second input shafts is released from driven connection with the engine, said fluid pump associated with the driven one of said first and second input shafts supplies high pressure fluid through said first control valve to said fluid pump associated with the released one of said first and second input shafts to synchronize the rotary speed of the released one of said first and second input shaft to said output shaft.

14. The powershift transmission of claim 13 wherein said first and second shift clutches are electrically-actuated dog clutches.

15. The powershift transmission of claim 13 wherein said primary clutch includes a housing fixed for rotation with an output of the engine, a first friction plate fixed for rotation with first input shaft, a piston supported in a pressure chamber defined by said housing, and a spring assembly biasing said piston into engagement with said first friction plate for establishing a friction coupling between said housing and said first friction plate to transfer power from the engine output to said first input shaft.

16. The powershift transmission of claim 15 wherein said secondary clutch includes a second friction plate disposed between said housing and said piston, and wherein said second control valve functions to supply fluid to said pressure chamber to cause said piston to move out of engagement with said first friction plate and into engagement with said second friction plate for establishing a friction coupling between said housing and said second friction plate to transfer power from the engine output to said second input shaft.

17. The powershift transmission of claim 16 wherein said second control valve is an electrically-actuated valve supplied with high pressure fluid from one of said first and second fluid pumps.

* * * * *